(12) United States Patent
Braun et al.

(10) Patent No.: US 12,000,479 B2
(45) Date of Patent: Jun. 4, 2024

(54) SHIFTING ASSEMBLY FOR A TRANSMISSION

(71) Applicant: Revolute GmbH, Kassel (DE)

(72) Inventors: Caspar Braun, Kassel (DE); Daniel Schlereth, Reichenbach (DE)

(73) Assignee: Revolute GmbH, Kassel (DE)

( * ) Notice: Subject to any disclaimer, the term of this patent is extended or adjusted under 35 U.S.C. 154(b) by 16 days.

(21) Appl. No.: 17/801,211

(22) PCT Filed: Jan. 29, 2021

(86) PCT No.: PCT/EP2021/052085
§ 371 (c)(1),
(2) Date: Aug. 19, 2022

(87) PCT Pub. No.: WO2021/165016
PCT Pub. Date: Aug. 26, 2021

(65) Prior Publication Data
US 2023/0075440 A1 Mar. 9, 2023

(30) Foreign Application Priority Data
Feb. 21, 2020 (DE) .......................... 102020104676.6

(51) Int. Cl.
*F16H 63/08* (2006.01)
*F16H 3/46* (2006.01)
(Continued)

(52) U.S. Cl.
CPC ............... *F16H 63/08* (2013.01); *F16H 3/46* (2013.01); *F16H 3/66* (2013.01);
(Continued)

(58) Field of Classification Search
CPC ... F16H 63/08; F16H 3/46; F16H 3/66; F16H 2003/442; F16H 3/54; F16H 3/005;
(Continued)

(56) References Cited

U.S. PATENT DOCUMENTS

2011/0099994 A1* 5/2011 Reisch .................... F16D 48/02
60/477
2016/0258529 A1* 9/2016 Kuwahara ............... F16H 61/04

FOREIGN PATENT DOCUMENTS

DE 858062 C 12/1952
DE 102011101151 A1 12/2011
(Continued)

OTHER PUBLICATIONS

Machine translation of DE 102011101151 A1 (Year: 2011).*

*Primary Examiner* — Jacob S. Scott
*Assistant Examiner* — Farhana Pervin
(74) *Attorney, Agent, or Firm* — DINSMORE & SHOHL LLP

(57) ABSTRACT

A shifting assembly for a transmission at least has a first component, a second component, and a third component, the components interacting according to the shift state in that a friction clutch is arranged between the first component and the second component, a positively-locking clutch is arranged between the second component and the third component, and a freewheel unit is arranged between the second component and the third component. A connection means is provided which connects a clutch part of the friction clutch to a clutch part of the positively-locking clutch.

14 Claims, 4 Drawing Sheets

(51) Int. Cl.
*F16H 3/66* (2006.01)
*F16H 3/44* (2006.01)

(52) U.S. Cl.
CPC .................. *F16H 2003/442* (2013.01); *F16H 2200/0034* (2013.01); *F16H 2200/0039* (2013.01); *F16H 2200/2005* (2013.01); *F16H 2200/2007* (2013.01); *F16H 2200/2033* (2013.01); *F16H 2200/2064* (2013.01); *F16H 2200/2066* (2013.01); *F16H 2200/2082* (2013.01); *F16H 2200/2094* (2013.01)

(58) Field of Classification Search
CPC ..... F16H 2200/0034; F16H 2200/0039; F16H 2200/2005; F16H 2200/2007; F16H 2200/2033; F16H 2200/2064; F16H 2200/2066; F16H 2200/2082; F16H 2200/2094; F16H 2200/2038; F16H 2200/2035; F16H 2200/2041; F16H 2200/0021; F16H 57/10; F16H 2057/087; F16D 63/006; F16D 41/00; F16D 21/08; F16D 11/00; F16D 13/00; F16D 67/02
See application file for complete search history.

(56) References Cited

FOREIGN PATENT DOCUMENTS

| | | |
|---|---|---|
| DE | 102011083202 A1 | 3/2013 |
| DE | 102012216132 A1 | 3/2014 |
| DE | 102018117051 A1 | 1/2020 |

\* cited by examiner

| | | 1. Switching status | 2. Switching status | 3. Switching status |
|---|---|---|---|---|
| 1st Component (11) | 1. Rev. Direct. | closed | open | open |
| to 2nd Component (12) | 2. Rev. Direct. | closed | open | open |
| 2nd Component (12) | 1. Rev. Direct. | open | open | closed |
| to 3rd Component (13) | 2. Rev. Direct. | closed | closed | closed |
| 1st Component (11) | 1. Rev. Direct. | open | open | open |
| to 3rd Component (13) | 2. Rev. Direct. | open | open | open |

SHIFTING ASSEMBLY FOR A TRANSMISSION

CROSS-REFERENCE TO RELATED APPLICATIONS

This application is the U.S. National Stage of PCT/EP2021/052085 filed on Jan. 29, 2021, which claims priority to German Patent Application 10 2020 104 676.6 filed on Feb. 21, 2020, the entire content of both are incorporated herein by reference in their entirety.

FIELD OF THE INVENTION

The present invention relates to a shifting assembly for a transmission and to an associated transmission.

BACKGROUND OF THE INVENTION

Transmissions are machine elements by means of which kinetic quantities are variable, i.e. they serve the transfer and/or transformation of movements, energy and/or torques. Associated shifting assemblies comprise shifting elements, for example clutches, freewheel clutches, and brakes by means of which transmission components can be selectively brought into interaction with one another, decoupled from one another or fixed. In the sense of the present invention, a shifting assembly can be a component of a transmission and can also comprise further transmission components such as shafts or gears of a planetary gear train in addition to the shifting elements. A plurality of shiftable gear ratios results from the use of shifting elements in multispeed transmissions for power engines and applications for hybrid drive concepts and for bicycles are in particular also possible due to the small dimensions that can be implemented.

SUMMARY OF THE INVENTION

It is the object of the present invention to propose a further development of a shifting assembly for a transmission that enables a coupling of three transmission components in different shifting states, with in particular a simple actuation of the shifting assembly being desired.

This object is achieved starting from a shifting assembly for a transmission as disclosed herein. Advantageous further developments of the invention are also disclosed herein.

The invention includes the technical teaching that the shifting assembly has at least a first component, a second component, and a third component, wherein the components interact in dependence on the shifting state in that:
  a friction clutch is arranged between the first component and the second component;
  a positively locking clutch is arranged between the second component and the third component; and
  a freewheel clutch unit is arranged between the second component and the third component;
  and wherein a connection means is provided that connects a coupling part of the friction clutch to a coupling part of the positively locking clutch.

The invention here starts from the idea of mechanically or hydraulically connecting the shiftable parts of the friction clutch and of the positively locking clutch to one another by means of the connection means so that both clutches are shiftable by means of an actuation of the connection means. The parallel connection of the freewheel clutch unit and the positively locking clutch between the second and third transmission components acts like a lockable freewheel clutch by means of which the two transmission components are selectively rotationally fixedly couplable to one another in one or in both directions of rotation. A power transmission is thereby possible on a reversal of the torque direction in the shifting assembly, which is necessary, for example, for recuperation in a vehicle having an electric drive or for reversing. To actuate the positively locking clutch, a synchronization of the second and third components is necessary that is implemented by the freewheel clutch unit.

A power split transmission represents a preferred application. It can work, for example, in accordance with the principle of planetary sets and/or of spur gear differentials. In such an application, for example, a shaft rotationally fixedly connected to a component of a planetary set (sun, planetary carrier, annulus gear) can be alternately coupled with an input shaft or with a rigid shaft. Two speeds having different gear transmission ratios result from these shifting positions in a power transmission. Which direction of rotation can transfer power in the different shifting positions is dependent on the arrangement here. Various technical advantages results from this. For example, two forward gears and one reverse gear can be implemented in a planetary set with the shifting assembly in accordance with the invention having a friction clutch, a freewheel clutch device, and a positive locking clutch. They can be connected free of traction power interruption. In the prior art, at least two multidisk clutches that have to be precisely synchronized, in a similar manner to a classical duplex clutch, in the shifting process are required for this purpose. In addition, the energy consumption for shifting two multidisk clutches is considerably higher than with the shifting assembly in accordance with the invention, which has a significant effect on the efficiency of the transmission. A complex actuation of two multidisk clutches by means of two actuating means in shifting assemblies in accordance with the prior art is likewise necessary, which has a negative effect in the construction space taken up and in the manufacturing and assembly effort. With the aid of the shifting assembly in accordance with the invention in a power split transmission, it is sufficient on an acceleration process to open tor o close a single multidisk clutch by means of a single actuating means. On an opening of the multidisk clutch, the freewheel clutch unit engages and prevents a free rotation of the connected components of an exemplary planetary transmission. It is thus ensured that the power flow can act over the shifted component or over one or more other components. An "idling" that can temporarily occur in an unwanted manner with a badly synchronized duplex clutch is prevented in the shifting assembly in accordance with the invention. To ensure a reverse speed and a recuperation of the movement energy of the vehicle, the shifting assembly is provided with a positively locking clutch that for safety reasons can only be shifted selectively with the friction clutch. The positively locking clutch and the friction clutch can thus not be closed at the same time. This positively locking clutch can rotationally fixedly couple two shafts with one another that were synchronized by the freewheel clutch device. A power transmission is thus also possible with a reverse torque direction, for example in the reverse gear or on the use of the engine brake or the energy recovery in electric vehicles.

In an advantageous embodiment, the shifting assembly comprises the following shifting states:
  friction clutch open and positively locking clutch closed; or
  friction clutch open and positively locking clutch open; or
  friction clutch closed and positively locking clutch open.

These three shifting states are here serially shiftable via the connection means due to the preferably rigid connection of the clutches, i.e. a closing of the one clutch requires a preceding opening of the other clutch. The shifting assembly can thus, for example, be used for the implementation of two forward speeds. With a reverse direction of rotation of the input shaft of the transmission, such as is possible with electric drives, a reverse speed can likewise hereby be implemented.

At least two of the components are preferably coaxially rotatable with respect to one another and/or at least one of the components is rotationally fixed. A rotationally fixed component here in particular represents a transmission case. A special embodiment comprises configuring all three components as coaxially rotatable with respect to one another.

The shifting assembly in particular has an actuating means, with the actuating means being adapted to displace the connection means so that the shifting state of the friction clutch and/or of the positively locking clutch can be set by means of the actuating means. The actuating means is, for example, formed as a hydraulic actuating means or as a pneumatic actuating means or as a mechanical actuating means or as an electromechanical actuator or as an electromagnetic actuator. A suitable form of an electromechanical actuator is here represented for instance by a rolling element ramp actuator. The actuating means is preferably complemented by a return spring, with the return spring being adapted to displace the connection means. The use of a return spring is advantageous since hydraulic, pneumatic, and electromechanical actuating means can frequently only apply the high forces required for the closing or opening of the return spring in one direction. The return spring thus in particular serves the actuation of the positively locking clutch, for which purpose smaller forces are typically required.

In an advantageous embodiment, the friction clutch is formed as a multidisk clutch and/or the positively locking clutch is formed as a dog clutch. The dog clutch is further advantageously formed as self-aligning in that the dogs of the dog clutch are formed as chamfered on a rear side that does not transfer power or in that the dog clutch has a coil spring unit. The power transfer by the dog clutch takes place due to the freewheel clutch unit connected in parallel only in one direction of rotation, namely in that direction of rotation in which the freewheel clutch unit does not couple the second and third components. The chamfered configuration of the non-power transferring rear side of the dogs or the support of half of the clutch by means of a coil spring unit ensures a low-friction closing of the dog clutch independently of the position of the two clutch halves.

The invention further relates to a transmission that comprises at least two shafts rotatable coaxially with respect to one another and/or at least one rotationally fixed shaft, with the transmission having at least one shifting assembly in accordance with one of the aforesaid embodiments.

The first component of the shifting assembly is here, for example, rotationally fixedly operatively connected to one of the rotatable shafts or to the rotationally fixed shaft and/or the second component is rotationally fixedly operatively connected to one of the rotatable shafts and/or the third component is rotationally fixedly operatively connected to one of the rotatable shafts or to the rotationally fixed shaft.

The rotatable shafts can in particular act as input shafts or as output shafts. Within the framework of the present invention, such a shaft is considered an input shaft that is formed in the transmission for the power coupling of a drive unit, for example an internal combustion engine or an electric motor. Such a shaft is considered an output shaft that is formed for the power decoupling from the transmission in the direction of an output, in particular the output shaft of a motor vehicle or also a work machine. This power flow corresponds to the traction mode of the drive train with respect to a motor vehicle transmission. The power flow and torque direction of the transmission reverse when cruising and/or in recuperation operation. The same applies in operation of the propulsion engine against the customary drive direction, for example in reverse gear with an electric drive.

In an embodiment in accordance with the invention, the transmission has at least one planetary set having at least one sun gear, having at least one planetary carrier, and having at least one annulus gear, wherein the rotatable shafts are formed as a driving shaft and as an output shaft, and wherein the first component and/or the third component is/are rotationally fixedly operatively connected to the input shaft and/or to the output shaft, and/or wherein the second component is rotationally fixedly operatively connected to the sun gear or to the planetary carrier or to the annulus gear.

In an embodiment as a 2-speed transmission, the transmission in accordance with the invention comprises a rotationally fixed shaft, for instance in the form of a casing, an input shaft, and an output shaft and furthermore has a planetary set having at least one sun gear, having at least one planetary gear, and having at least one annulus gear, wherein the first component is rotationally fixedly operatively connected to the input shaft and wherein the second component is formed as the annulus gear and the third component is formed as the rotationally fixed shaft, wherein the input shaft is rotationally fixedly operatively connected to the sun gear and the output shaft is rotationally fixedly operatively connected to the planetary carrier.

In an embodiment, as a 3-speed transmission, the transmission comprises a rotationally fixed shaft, for example in the form of a casing, an input shaft, and an output shaft and furthermore has a first shifting assembly and a second shifting assembly and further comprises a planetary set having at least one sun gear having at least one planetary carrier, and having at least one annulus gear, wherein, in the first shifting assembly the first component is formed as the rotationally fixed shaft;
the second component is formed as the sun gear; and/or
the third component is formed as the output shaft;
and/or wherein, in the second shifting assembly
the first component is formed as the rotationally fixed shaft;
the second component is formed as the annulus gear; and/or
the third component is formed as the output shaft;
and/or wherein the output shaft is rotationally fixedly operatively connected to the planetary carrier.

In a further embodiment, the transmission comprises a rotationally fixed shaft, in particular in the form of a casing, a first input shaft, a second input shaft, and an output shaft and furthermore has a first shifting assembly in accordance with the invention and a second shifting assembly in accordance with the invention, and furthermore comprises a first planetary set and a second planetary set, each having at least one sun gear, having at least one planetary carrier, and having at least one annulus gear, wherein the annulus gear of the first planetary set and the sun gear of the second planetary set are rotationally fixedly operatively connected to one another and form an intermediate element and wherein, in the first shifting assembly the first component is formed as the rotationally fixed shaft;

the second component is formed as the planetary carrier of the first planetary set; and/or the third component is formed as the output shaft; and/or wherein, in the second shifting assembly the first component is formed as the rotationally fixed shaft;

the second component is formed as the annulus gear of the second planetary set; and/or the third component is formed as the output shaft; and/or wherein the first input shaft is rotationally fixedly operatively connected to the planetary carrier of the second planetary set and/or the second input shaft is rotationally fixedly operatively connected to the sun gear of the first planetary set. This embodiment represents a double nested planetary transmission having two power inputs, for example for a use in a hybrid drive.

BRIEF DESCRIPTION OF THE DRAWINGS

Further measures improving the invention will be shown in more detail below together with the description of preferred embodiments of the invention with reference to the Figures. There are shown.

DETAILED DESCRIPTION OF THE PREFERRED EMBODIMENTS

Figures 1, 2:
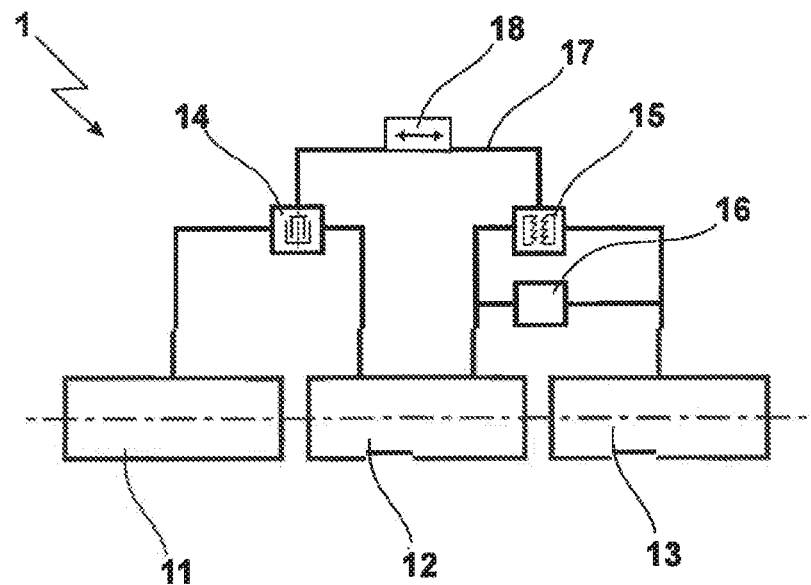
FIG. 1 is a schematic representation of the shifting assembly in accordance with the invention.
FIG. 2 is a tabular overview of shifting states of a shifting assembly in accordance with the invention.

FIG. 1 shows a schematic representation of the shifting assembly 1 in accordance with the invention. The first component 11, the second component 12, and the third component 13 are here shown by way of example rotationally coaxially with respect to one another about a common axis. The first component 11 is rotationally fixedly connectable to the second component 12 by means of the friction clutch 14 and the second component 12 is in interaction with the third component 13 by means of the parallel connection of the positively locking clutch 15 and the freewheel clutch unit 16. In this respect, the friction clutch 14 and the positively locking clutch 15 are connected to one another, preferably rigidly, via the connection means 17 and the actuating means 18 is configured to displace the connection means 17, whereby the shifting state of the shifting assembly 1 is selectable.

The three shifting states shown in tabular form in FIG. 2 are shiftable by the shifting assembly 1. The first shifting state corresponds to a closed friction clutch 14 with an open positively locked clutch 15, the second shifting state corresponds to an open position of both the friction clutch 14 and the positively locking clutch 15, and the third shifting state corresponds to a closed positively locking clutch 15 with an open friction clutch 14. In the closed state, both the friction clutch 14 and the interplay of the freewheel clutch unit 16 and the positively locking clutch 15 provide a respective connection rotationally fixed in both rotational directions between the respective transmission components 11 and 12 or 12 and 13. The freewheel clutch unit 16 releases the second component 12 and the third component 13 in a first rotational direction of the three components 11, 12, and 13 and connects them rotationally fixedly in the opposite second rotational direction. The connection means 17 represents a connection, in particular a rigid connection, between a movable clutch part of the friction clutch 14 and a movable clutch part of the positively locking clutch 15 so that the three shifting states are only shiftable sequentially, i.e. the shifting assembly always adopts the second shifting state between a first and a third shifting state. In accordance with the invention, it is thus possible to change between three different shifting states with a single actuation. A position of the shifting assembly 1 in which both the friction clutch 14 and the positively locking coupling 15 are closed is precluded here.

Figure 3:
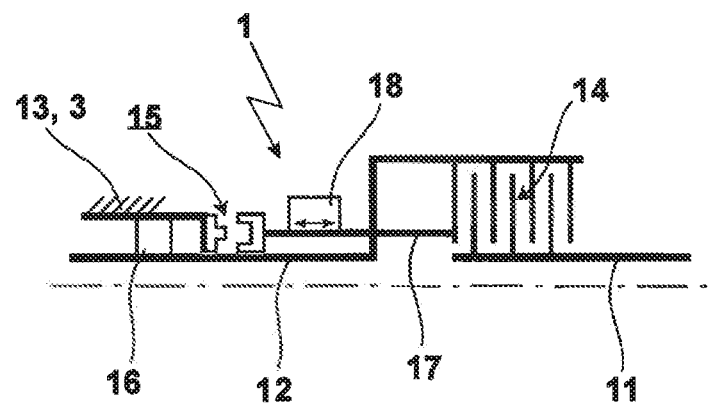
FIG. 3 is a representation of a first shifting assembly in accordance with the invention.
Figure 4:
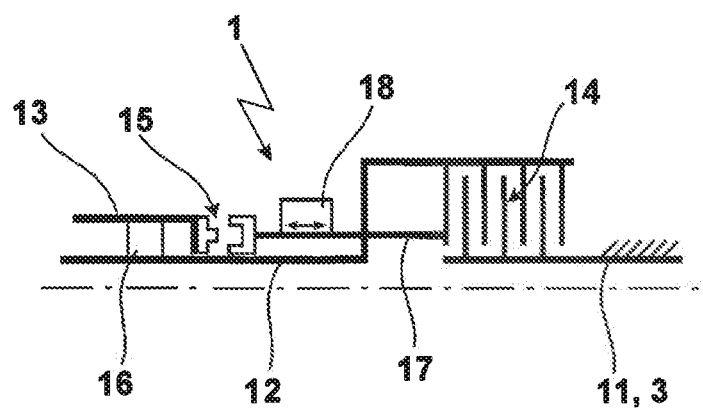
FIG. 4 is a representation of a second shifting assembly in accordance with the invention.
Figure 5:
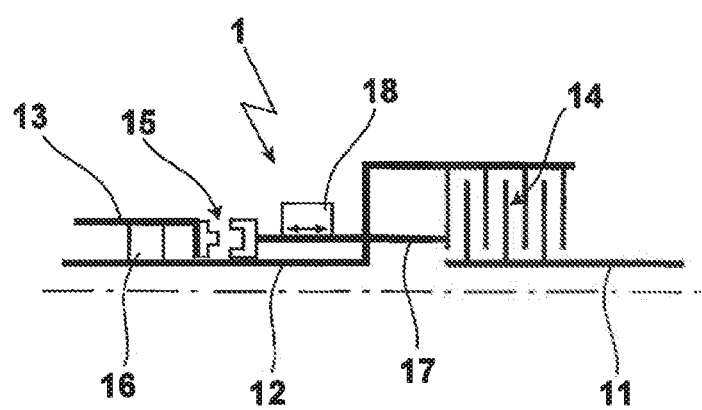
FIG. 5 is a representation of a third shifting assembly in accordance with the invention.

FIGS. 3 to 5 show different options of the shifting assembly 1 in accordance with the invention having coaxially rotatable components and/or having a rotationally fixed shaft. The friction clutch 14 is here respectively configured in the form of a multidisk clutch and the positively locking clutch 15 in the form of a dog clutch. The connection means 17 provides a preferably rigid connection between the movable parts of the two clutches 14 and 15 so that a switch between the different shifting states can be made by a displacement of the connection means 17 via the actuating means 18.

In the embodiment shown in FIG. 3, the first component 11 and the second component 12 are formed as rotatable shafts or are rotationally fixedly operatively connected to such and the third component 13 represents the rotationally fixed shaft 3, for example a transmission casing.

In the embodiment shown in FIG. 4, the second component 12 and the third component 13 are formed as rotatable shafts or are rotationally fixedly operatively connected to such and the first component 11 represents the rotationally fixed shaft 3.

In the embodiment shown in FIG. 5, both the first component 11 and the second component 12 and the third component 13 are formed as rotatable shafts or are rotationally fixedly operatively connected to such.

Figure 6:
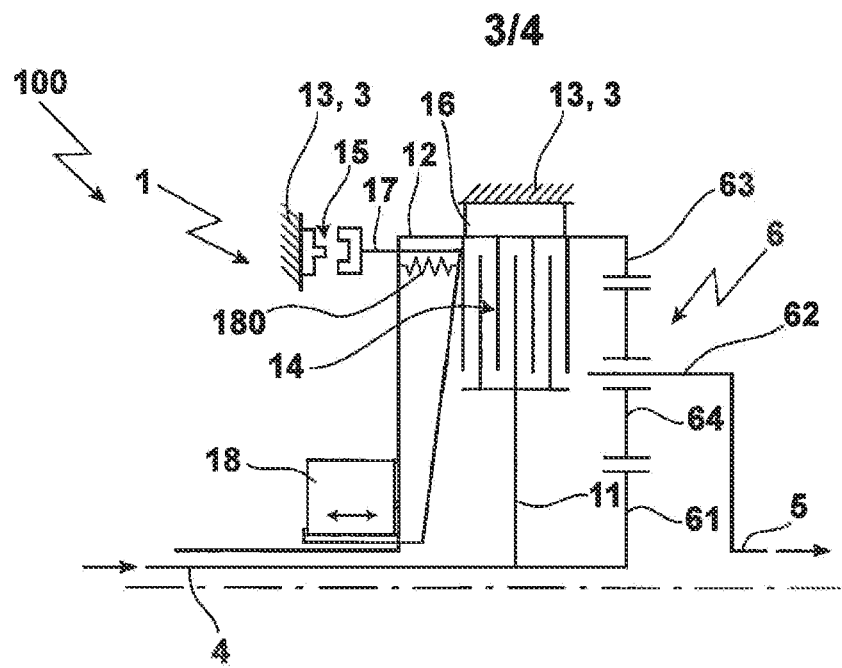
FIG. 6 is a representation of a 2-speed transmission in accordance with the invention.

FIG. 6 shows a shifting assembly 1 in a transmission 100 that comprises a rotationally fixed shaft 3, in particular in the form of a transmission casing, an input shaft 4, and an output shaft 5 and has a planetary set 6 having a sun gear 61, having a planetary carrier 62, having an annulus gear 63, and having planetary gears 64. The first component 11 of the shifting assembly 1 is here rotationally fixedly operatively connected to the input shaft 4 and the second component 12 is rotationally fixedly connected to the annulus gear 63 and the third component 13 is configured as the rotationally fixed shaft 3. The input shaft 4 of the transmission 100 is rotationally fixedly operatively connected to the sun gear 61 and the output shaft 4 is rotationally fixedly connected to the planetary carrier 62. Two forward speeds of different gear ratios and one reverse speed with a reversed input speed are implemented at the input shaft 4 by the transmission 10 shown. In a shifting state corresponding to the first speed, the friction clutch 14 is open and the positively locking clutch 15 is closed so that the annulus gear 63 is firmly braked at the rotationally fixed shaft 3 by means of the positively locking clutch 15 or by means of the freewheel clutch unit 16. The freewheel clutch unit 16 Is here oriented such that it engages in a rotational direction corresponding to the reverse direction and fixes the annulus gear 63 to the rotationally fixed shaft 3. In the opposite rotational direction of the transmission corresponding to the reverse speed, the annulus gear 63 is fixed via the positively locking clutch 15.

The combined effect of the positively locking clutch 15 and the freewheel clutch unit 16 becomes visible here by way of example—The planetary carrier 62 works against the resistance of the output shaft 5 when accelerating until the annulus gear 63 would have to rotate against the drive direction due to the gear transmission ratio. This is prevented by the freewheel clutch unit 16. If, on the other hand, the input shaft 4 is operated in the opposite rotational direction to drive in reverse, the planetary carrier 62 would be stationary due to the resistance of the output shaft 5, whereby the annulus gear 63 would overrotate freely and no force transmission would take place. Due to the closed positively locking clutch 15, however, the annulus gear 63 is fixed at the rotationally fixed shaft 3 so that the planetary carrier 62 necessarily rotates against the output resistance.

A further forward speed of the transmission 100 with a smaller gear ratio is implemented by a further shifting state of the shifting assembly 1 that is formed by a closed friction clutch 14 with an open positively locking clutch 15. The change between these shifting states is implemented by the actuating means 18 that acts on the connection means 17 and that is formed to close the friction clutch 14 or the positively locking clutch 15 against the return force of the return spring 180.

Figure 7:
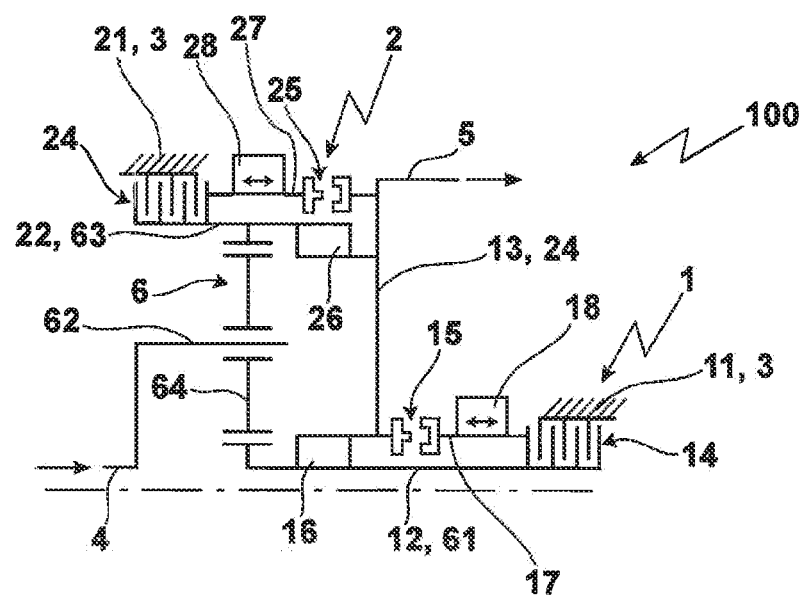
FIG. 7 is a representation of a 3-speed transmission in accordance with the invention.

FIG. 7 shows a 3-speed transmission 100 that comprises a rotationally fixed shaft 3, in particular in the form of a transmission casing, an input shaft 4, and an output shaft 5 and has a first shifting assembly 1 in accordance with the invention and a second shifting assembly 2 in accordance with the invention as well as furthermore a planetary set 6 having a sun gear 61, having a planetary carrier 62, having an annulus gear 63, and having planetary gears 64. In this respect, the first component in the first shifting assembly 1 is configured as the rotationally fixed shaft 3, the second component as the sun gear 61, and the third component 13 as the output shat 5, and the first component 21 in the second shifting assembly 2 is configured as the rotationally fixed shaft 3, the second component 22 as the annulus gear 63, and the third component 23 as the output shaft 5, with the input shaft 4 being rotationally fixedly operatively connected to the planetary carrier 62. The sun gear 61 interacts with the output shaft 5 via the positively locking clutch 15 and the freewheel clutch unit 16 and can be firmly braked at the rotationally fixed shaft 3 by means of the friction clutch 14. The annulus gear 63 is rotationally fixedly connectable to the output shaft 5 via the positively locking clutch 25 and the freewheel clutch unit 26 and can be firmly braked at the rotationally fixed shaft 3 by means of the friction clutch 24

Figure 8:
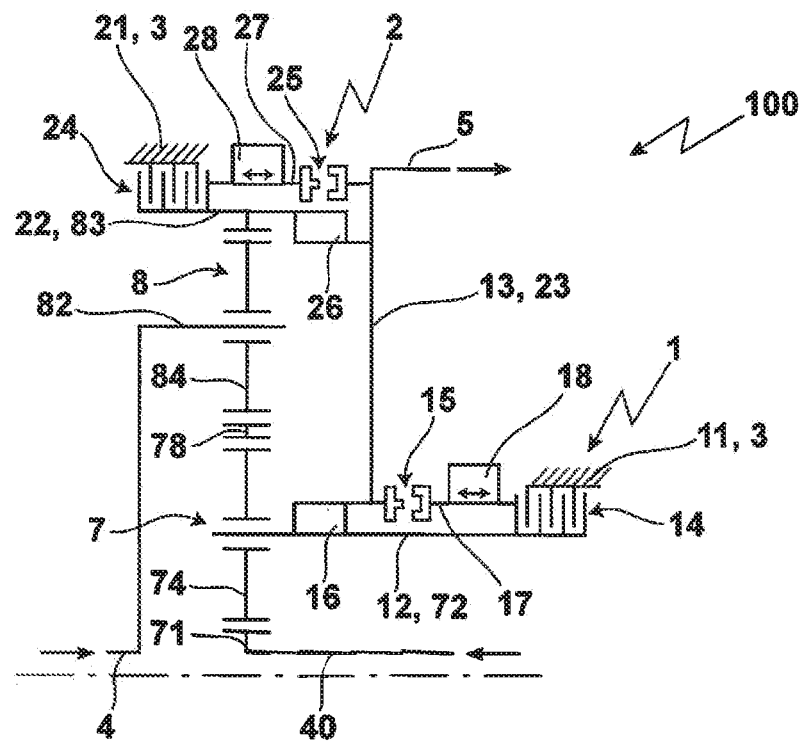
FIG. 8 is a representation of a transmission in accordance with the invention for hybrid drives.

FIG. 8 shows a transmission 100 having two input shafts 4 and 40 via which, in a hybrid drive concept, for example, power can be coupled into the transmission 100 both via an internal combustion engine and/or an electric motor. The transmission 100 has a first shifting assembly 1 and a second shifting assembly 2 and furthermore a first planetary set 7 and a second planetary set 8, each having a sun gear 71, having a planetary carrier 72, 82, having an annulus gear 83, and having planetary gears 74, 84, wherein the annulus gear of the first planetary set 7 and the sun gear of the second planetary set 8 are rotationally fixedly operatively connected to one another and form the intermediate element 78. The first component 11 in the first shifting assembly 1 is configured as the rotationally fixed shaft 3, the second component 12 as the planetary carrier 72, and the third component 13 as the output shat 5, and the first component 21 in the second shifting assembly 2 is configured as the rotationally fixed shaft 3, the second component as the annulus gear 83, and the third component 23 as the output shaft 5. In this respect, the first input shaft 4 is rotationally fixedly operatively connected to the planetary carrier 82 of the second planetary set 8 and the second input shaft 40 is rotationally fixedly operatively connected to the sun gear 71 of the first planetary set 7. The planetary carrier 72 of the first planetary set 7 can be interactively connected to the output shaft 5 or can be firmly braked at the rotationally fixed shaft 3 via the first shifting assembly 1. The annulus gear 83 of the second planetary set 8 can be interactively connected to the output shaft 5 or can be firmly braked at the rotationally fixed shaft 3 by means of the second shifting assembly 2.

Figures 9A, 9B:
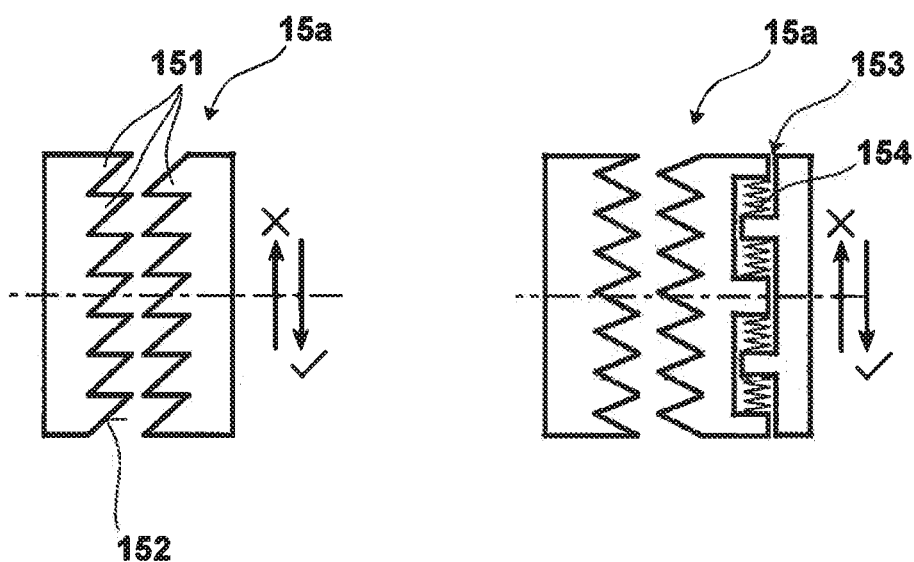
FIGS. 9a and 9b are representations of two embodiments of the self-aligning dog clutch.

FIGS. 9a and 9b show two embodiments of a positively locking clutch as a self-aligning dog clutch 15a.

In the embodiment shown in FIG. 9a, the dogs 151 are formed as chamfered on the rear side 152 not transferring power. In a shifting assembly in accordance with the invention, the power transfer takes place by means of the dog clutch due to the freewheel clutch unit connected in parallel only in one direction of rotation namely in that direction of rotation in which the freewheel clutch unit does not rotationally fixedly connect the second and third components of the shifting assembly. On the closing of the dog clutch 15a, the chamfered rear sides 152 of the two dog halves can slide along one another so that a low-friction and reliable closing of the dog clutch 15a is ensured and thus a jamming of the shifting assembly in accordance with the invention is avoided.

The alternative embodiment of the self-aligning dog clutch 15a shown in FIG. 9b likewise makes a reliable closing possible. For this purpose, in this case, the one half of the clutch 15a is supported by means of the coil spring unit 153, wherein the coil spring unit 153 enables a rotation of the supported clutch half by, for example, a few degrees against the return force of the spring 154. A self-aligning closing procedure of the dog clutch 15a is thereby ensured.

The invention is not restricted in its design to the preferred embodiments specified above. A transmission setup may additionally have any desired number of shifting assemblies in accordance with the invention. A number of variants is rather conceivable that also makes use of the solution shown with generally differently designed embodiments. All the features and/or advantages, including any construction details or spatial arrangements, originating from the claims, the description or the drawings can be essential to the invention both per se and in the most varied combinations.

| Reference numeral list | |
| --- | --- |
| 100 | transmission |
| 1, 2, | shifting assembly |
| 11, 21 | first component |
| 12, 22 | second component |
| 13, 23 | third component |
| 14, 24 | friction clutch |
| 15, 25, | positively locking clutch |
| 15a | dog clutch |
| 151 | dog |

-continued

| Reference numeral list | |
|---|---|
| 15 | rear side |
| 153 | coil spring unit |
| 154 | spring |
| 16, 26 | freewheel clutch unit |
| 17, 27 | connection means |
| 18, 28 | actuating means |
| 180 | return spring |
| 3 | rotationally fixed shaft |
| 4, 40 | input shaft |
| 5 | output shaft |
| 6, 7, 8 | planetary set |
| 61, 71 | sun gear |
| 62, 72, 82 | planetary carrier |
| 63, 83 | annulus gear |
| 64, 74, 84 | planetary gear |
| 78 | intermediate element |

The invention claimed is:

1. A transmission comprising a shifting assembly, the shifting assembly comprising:
a first component;
a second component; and
a third component;
wherein the components interact in dependence on a shifting state in that:
a friction clutch is arranged between the first component and the second component;
a positive clutch is arranged between the second component and the third component; and
a freewheel clutch unit is arranged between the second component and the third component, and
wherein a connection means is provided that connects a coupling part of the friction clutch to a coupling part of the positive locking clutch; and
at least one of the components is rotationally fixed.

2. A The transmission in accordance with claim 1, wherein the shifting assembly further comprises the following shifting states:
friction clutch open and positively locking clutch closed; or
friction clutch open and positively locking clutch open; or
friction clutch closed and positively locking clutch open.

3. A The transmission in accordance with claim 1, wherein at least two of the components of the shifting assembly are coaxially rotatable with respect to one another and/or at least one of the components is rotationally fixed.

4. The transmission in accordance with claim 1, further comprising:
an actuating means adapted to displace the connection means so that the shifting state of the friction clutch and/or of the positively locking clutch can be set by the actuating means.

5. The transmission shifting assembly in accordance with claim 4, wherein
the actuating means is configured as a hydraulic actuating means or as a pneumatic actuating means or as a mechanical actuating means or as an electromechanical actuator or as an electromagnetic actuator.

6. The transmission in accordance with claim 4, wherein the actuating means has a return spring, with the return spring being configured to displace the connection means.

7. The transmission in accordance with claim 1, wherein the friction clutch is formed as a multidisk clutch and/or the positively locking clutch is formed as a dog clutch.

8. The transmission in accordance with claim 7, wherein the dog clutch is formed as self-aligning in that dogs of the dog clutch are formed as chamfered on a rear side not transferring power or in that the dog clutch has a coil spring unit.

9. The transmission in accordance with claim 1, further comprising:
at least two shafts coaxially rotatable with respect to one another and at least one rotationally fixed shaft.

10. The transmission in accordance with claim 9, wherein the first component is rotationally fixedly operatively connected to one of the rotatable shafts or to the rotationally fixed shaft or the second component is rotationally fixedly operatively connected to one of the rotatable shafts or the third component is rotationally fixedly operatively connected to one of the rotatable shafts or to the rotationally fixed shaft.

11. The transmission in accordance with claim 9, wherein the transmission has at least one planetary set having at least one sun gear, having at least one planetary carrier, and having at least one annulus gear, wherein the at least two shafts are formed as an input shaft and as an output shaft, and wherein the first component or the third component is/are rotationally fixedly operatively connected to the input shaft or to the output shaft and to the rotationally fixed shaft, or wherein the second component is rotationally fixedly operatively connected to the sun gear or to the planetary carrier or to the annulus gear.

12. The transmission in accordance with claim 9, wherein:
the at least one rotationally fixed shaft comprises a rotationally fixed shaft;
the at least two shafts coaxially rotatable comprise an input shaft and an output shaft; and
the transmission further comprises a planetary set having at least one sun gear, having at least one planetary gear, and having at least one annulus gear, wherein the first component is rotationally fixedly operatively connected to the input shaft and wherein the second component is formed as the annulus gear and the third component is formed as the rotationally fixed shaft, wherein the input shaft is rotationally fixedly operatively connected to the sun gear and the output shaft is rotationally fixedly operatively connected to the planetary carrier.

13. The transmission in accordance with claim 9, wherein:
the at least one rotationally fixed shaft comprises a rotationally fixed shaft;
the at least two shafts coaxially rotatable comprise an input shaft and an output shaft; and
the transmission further comprises a planetary set having at least one sun gear, having at least one planetary carrier, and having at least one annulus gear, wherein, in the first shifting assembly
the first component is formed as the rotationally fixed shaft;
the second component is formed as the sun gear; or
the third component is formed as the output shaft, or wherein, in the second shifting assembly,
the first component is formed as the rotationally fixed shaft;
the second component is formed as the annulus gear or the third component is formed as the output shaft, or wherein the input shaft is rotationally fixedly operatively connected to the planetary carrier.

14. The transmission in accordance with claim 9, wherein the at least one rotationally fixed shaft comprises a rotationally fixed shaft;

the at least two shafts coaxially rotatable comprise an input shaft, a second input shaft, and an output shaft; and the transmission further comprises a first shifting assembly and a second shifting assembly, and furthermore comprises a first planetary set and a second planetary set, each having at least one sun gear, having at least one planetary carrier, and having at least one annulus gear, wherein the annulus gear of the first planetary set and the sun gear of the second planetary set are rotationally fixedly operatively connected to one another and form an intermediate element and wherein, in the first shifting assembly, the first component is formed as the rotationally fixed shaft;

the second component is formed as the planetary carrier of the first planetary set; or the third component is formed as the output shaft, or wherein, in the second shifting assembly, the first component is formed as the rotationally fixed shaft;

the second component is formed as the annulus gear of the second planetary set; or the third component is formed as the output shaft; or wherein the first input shaft is rotationally fixedly operatively connected to the planetary carrier of the second planetary set or the second input shaft is rotationally fixedly operatively connected to the sun gear of the first planetary set.

* * * * *